United States Patent [19]
DiGrande et al.

[11] Patent Number: 5,213,218
[45] Date of Patent: May 25, 1993

[54] PELLET REJECT APPARATUS AND METHOD

[75] Inventors: John T. DiGrande, Columbia; Arlett J. Gallagher, Lexington, both of S.C.

[73] Assignee: Westinghouse Electric Corp., Pittsburgh, Pa.

[21] Appl. No.: 740,564

[22] Filed: Aug. 5, 1991

[51] Int. Cl.$^5$ .............................................. B07B 13/00
[52] U.S. Cl. ................................ 209/539; 209/579; 209/586; 209/653; 209/657; 376/261
[58] Field of Search .............. 209/539, 552, 576, 577, 209/579, 586, 651, 652, 653, 654, 656, 657; 376/258, 261; 414/146, 749; 198/372, 597; 53/504, 542

[56] References Cited

U.S. PATENT DOCUMENTS

| | | | |
|---|---|---|---|
| 2,617,526 | 11/1952 | Lapointe | 209/576 |
| 3,052,353 | 9/1962 | Pritchett | 209/576 X |
| 3,221,152 | 11/1965 | Jones | 235/151.13 |
| 3,955,678 | 5/1976 | Moyer | 198/372 X |
| 3,983,388 | 9/1976 | Gugliotta | 209/653 X |
| 4,098,408 | 7/1978 | Miller, Jr. et al. | 209/82 |
| 4,235,066 | 11/1980 | King et al. | 53/500 |
| 4,349,112 | 9/1982 | Wilks et al. | 209/538 |
| 4,496,056 | 1/1985 | Schoenig, Jr. et al. | 209/539 |
| 4,748,798 | 6/1988 | Udaka et al. | 414/146 X |
| 4,762,665 | 8/1988 | Billington et al. | 209/579 X |
| 4,894,201 | 1/1990 | Ahmed | 376/261 |
| 4,895,694 | 1/1990 | Yokoyama | 376/261 |

*Primary Examiner*—Kevin P. Shaver
*Assistant Examiner*—Joseph A. Kaufman

[57] ABSTRACT

A pellet diameter inspection system has a laser scanning apparatus operable for detecting and measuring the outside diameter of the pellets, a pellet transfer apparatus operable for transferring pellets end-to-end in a row along a feed path past the laser scanning apparatus, and a pellet reject apparatus operable for removing from the feed path any off-sized diameter pellets measured by the laser scanning apparatus. The pellet reject apparatus includes an ejector member and a support member capable of supporting the ejector member along and adjacent to one side of the feed path and of moving the ejector member through an eject stroke across the feed path from a home position to an end position in order to remove pellets from the feed path and through a reverse stroke across the feed path from the end position to the home position. The pellet reject apparatus also includes an actuator mounted to the support member and, in turn, mounting the ejector member.

8 Claims, 4 Drawing Sheets

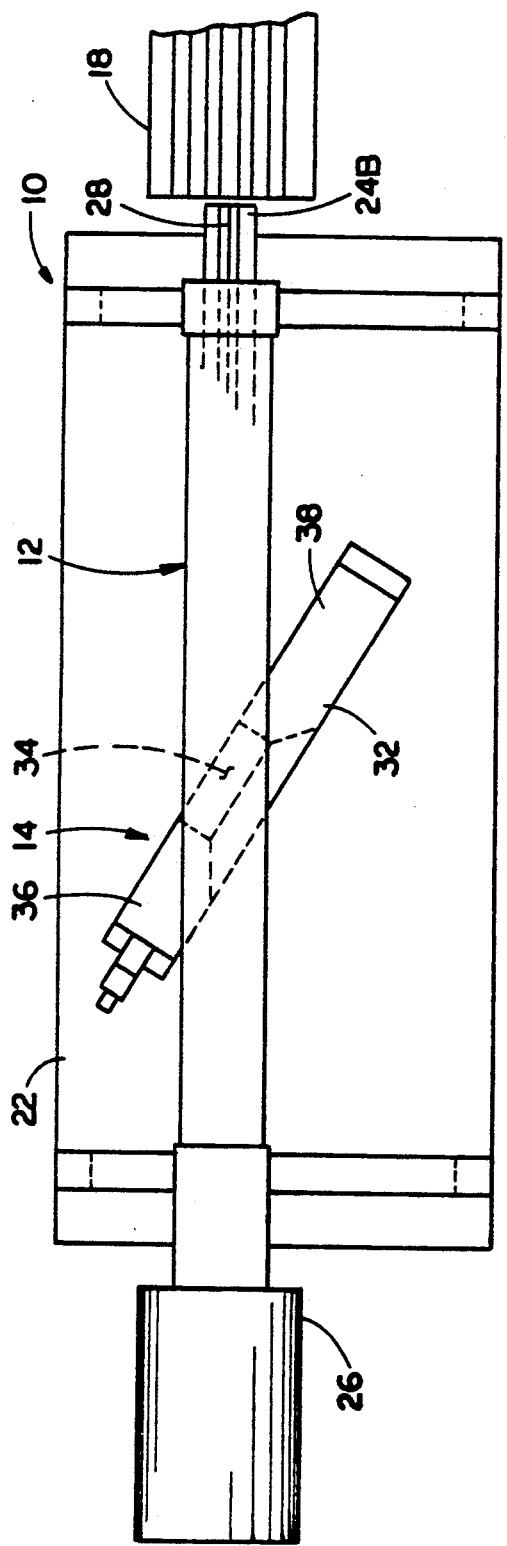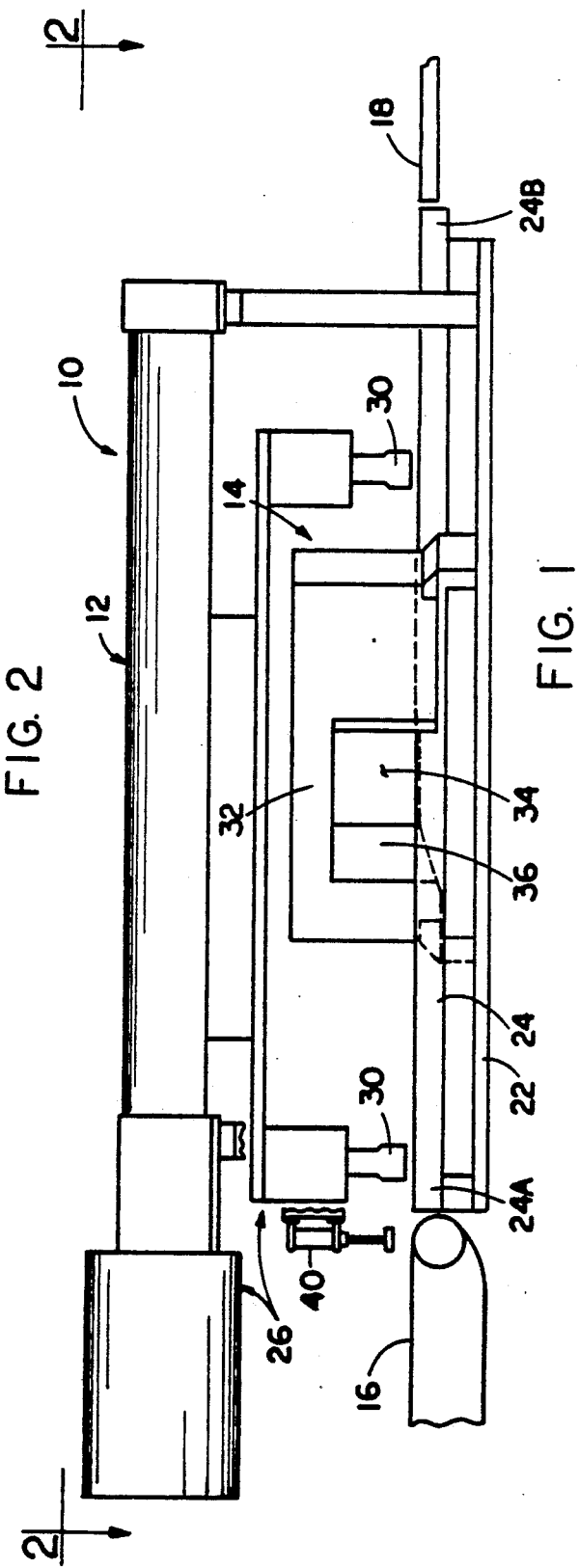

PELLET REJECT APPARATUS AND METHOD

CROSS REFERENCE TO RELATED APPLICATIONS

Reference is hereby made to the following copending applications dealing with related subject matter and assigned to the assignee of the present invention:

1. "Pellet Transfer Apparatus And Method" by John T. DiGrande et al, assigned U.S. Ser. No. 536,926 now U.S. Pat. No. 5,076,997 and filed Jun. 12, 1990. (W. E. 55,900)

2. "Laser Scanning Pellet Diameter Measurement Apparatus And Method" by John T. DiGrande et al, assigned U.S. Ser. No. 540,041 and filed Jun. 18, 1990 now U.S. Pat. No. 5,043,588. (W. E. 55,922)

BACKGROUND OF THE INVENTION

1. Field of the Invention

The present invention relates generally to nuclear fuel pellet diameter inspection, and more particularly, to a pellet reject apparatus and method which operates in conjunction with transfer and laser scanning of pellets to monitor detection of off-size pellets and to effectuate their rapid removal from a pellet production line.

2. Description of the Prior Art

A nuclear fuel pellet having an off-size diameter can greatly affect the efficiency and cost of manufacturing nuclear fuel rods. In particular, a pellet with an oversize diameter may clog the entry to the fuel rod, requiring the operator to turn off the pellet feeding apparatus, pull out the oversize pellet, and/or replace the affected fuel rod. This corrective measure wastes considerable manufacturing time.

Additionally, an oversize fuel pellet can cause premature and costly replacement of a nuclear fuel rod in the reactor core at a nuclear power plant. If a pellet is too large, the pellet-to-clad gap is reduced, leading to excessive clad stresses and potential fuel rod failure during core operation.

A recent pellet inspection system, which is designed to inspect 100% of the pellets moving in a production line, employs a pellet transfer apparatus in conjunction with a laser scanning apparatus for scanning pellets with a laser beam to measure and detect oversize ones as they are moved, arranged end-to-end in a single file row, from the grinding station to a pellet storage tray. The pellet transfer apparatus of this inspection system is the subject of the first patent application cross-referenced above, whereas the laser scanning apparatus of this system is the subject of the second cross-referenced patent application.

In the operation of the aforementioned inspection system, upon detection of an unacceptable, or off-size, pellet, the laser scanning apparatus causes the pellet transfer apparatus to halt. Since the laser scans up to fifteen pellets per second, identification of the offending pellet requires the inspector to manually re-run each of several downstream pellets through the scanner. This procedure results in unacceptable delays in production. The alternative is to manually remove a number of pellets each time the laser halts the flow of pellets. This approach, while reducing downtime, is also unattractive since many pellets must be removed due to uncertainty resulting from the large number of pellets passing the scanner each second.

Consequently, a need exists for a different way to remove off-size pellets so as to avoid the above-mentioned drawbacks.

SUMMARY OF THE INVENTION

The present invention provides a pellet reject apparatus and method designed to overcome the above-described drawbacks and satisfy the aforementioned needs. The pellet reject apparatus and method operates in conjunction with pellet transfer and laser scanning to monitor detection of off-size pellets and to effectuate their rapid removal from a pellet production line. The need for operator/inspector assistance is greatly reduced. Discard rates and production delays are also substantially lowered.

Accordingly, the present invention is directed to a pellet diameter inspection system which comprises: (a) means for detecting and measuring the outside diameter of pellets; (b) means for transferring pellets end-to-end in a row along a feed path past said detecting and measuring means; and (c) a pellet reject apparatus operable for removing from the feed path any off-sized diameter pellets detected and measured by said detecting and measuring means. The pellet reject apparatus includes (i) an ejector member, (ii) a support member mounted along and adjacent to one side of the feed path, and (iii) an actuator mounted to the support member and, in turn, mounting the ejector member along and adjacent to a side of the feed path opposite to the one side thereof. The actuator is operable to move the ejector member through an eject stroke across the feed path from a home position to an end position in order to remove pellets from the feed path and through a reverse stroke across the feed path from the end position to the home position.

More particularly, the actuator includes a pair of pressure fluid-actuated cylinders extending parallel to one another and mounted on the support member. The ejector member is attached and mounted in transverse relation to ends of the cylinders. The feed path is defined by a support track having a linear guide channel for supporting pellet. The ejector member has a lower edge portion inclined upwardly and away from the guide channel of the support track. The lower edge portion of the ejector member will engage a lower portion of the pellets to cause them to roll upwardly and over an edge of the guide channel upon ejection of the pellets from the feed path.

The present invention is also directed to a pellet inspection method which comprises the steps of: (a) detecting and measuring the outside diameter of pellets; (b) transferring pellets end-to-end in a row along a feed path past a station where the detecting and measuring is carried out; and (c) removing from the feed path any off-sized diameter pellets detected and measured at the station where the detecting and measuring is carried out. The removing of off-sized pellets includes (i) supporting an ejector member along and adjacent to a side of the feed path, (ii) moving the ejector member through an eject stroke across the feed path from a home position to an end position in order to remove pellets from the feed path and through a reverse stroke across the feed path from the end position to the home position. The detecting and measuring is carried out by laser scanning the pellets.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which:

FIG. 1 is a side elevational view of a pellet diameter inspection system for employing the pellet reject apparatus of the present invention in conjunction with the pellet transfer apparatus and laser scanning apparatus of the above cross-referenced patent applications.

FIG. 2 is a top plan view of the inspection system as seen along line 2—2 of FIG. 1.

DETAILED DESCRIPTION OF THE INVENTION

Figure 3:
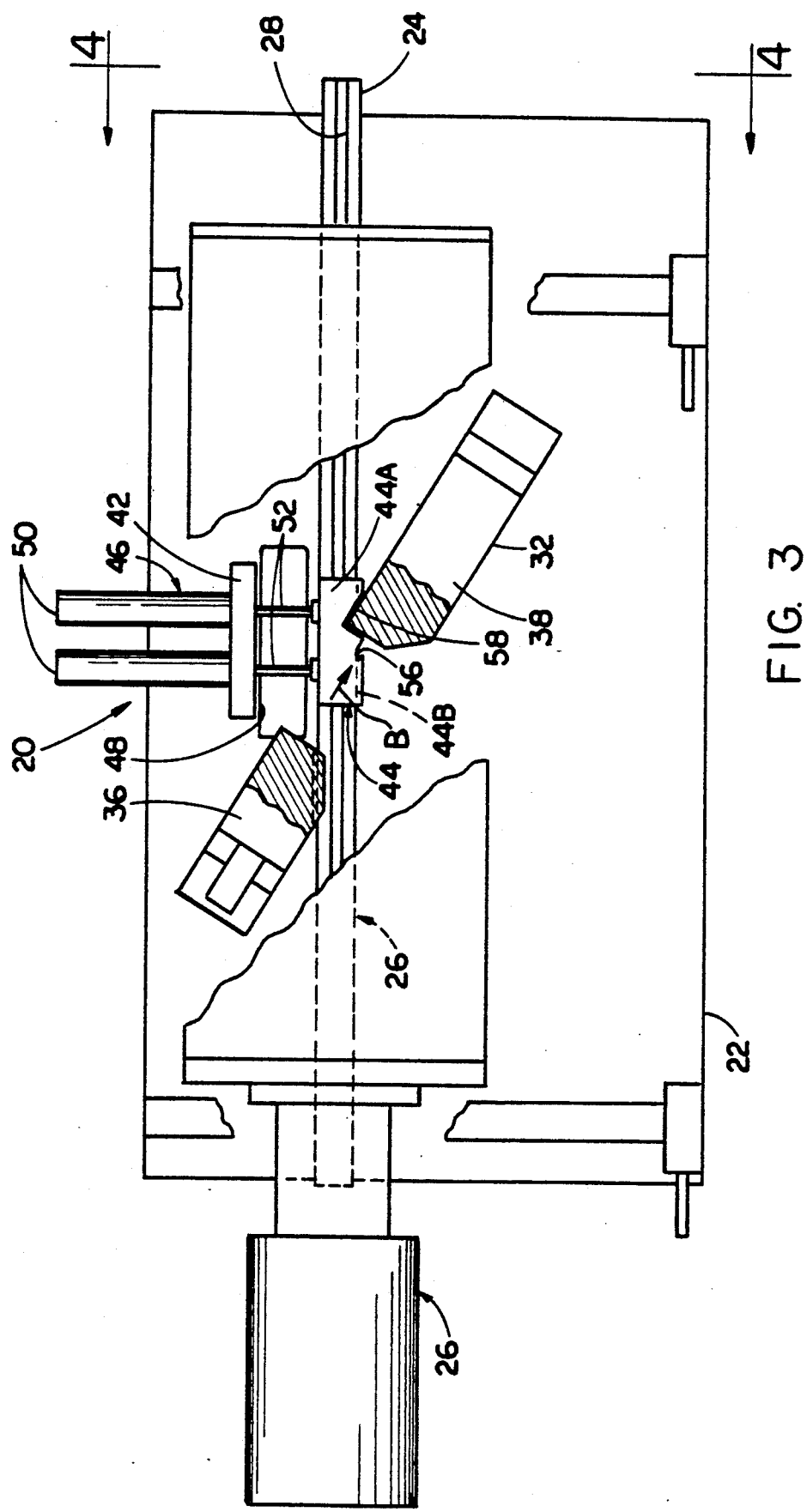
FIG. 3 is an enlarged top plan view of the inspection system with portions of the pellet transfer apparatus and laser scanning apparatus broken away and sectioned to expose the pellet reject apparatus of the present invention incorporated by the system.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Pellet Diameter Inspection System

Referring now to the drawings, and particularly to FIGS. 1 and 2, there is shown a pellet diameter inspection system, generally designated by the numeral 10. The inspection system 10 basically employs a pellet transfer apparatus 12 in conjunction with a laser scanning apparatus 14. The scanning apparatus 14 scans pellets P with a laser beam to measure and detect ones having off-sized (either oversized or undersized) outside diameters concurrently as the pellets P are advanced, arranged end-to-end in a single file row, by the transfer apparatus 12. The pellets P are received from a location, such as from a feed conveyor 16 at the exit of a pellet grinding station (not shown) and discharged to a location, such as a pellet storage tray 18. The pellet transfer apparatus 12 and laser scanning apparatus 14 are illustrated and described in detail in the above cross-referenced applications whose disclosures are incorporated herein by reference. The pellet transfer apparatus 12 and laser scanning apparatus 14 will only be described herein to the extent necessary to facilitate an understanding of the pellet reject apparatus of the present invention, generally designated by the numeral 20 in FIGS. 3-6.

The pellet transfer apparatus 12 of the inspection system 10 includes a mounting platform 22, an elongated stationary support track 24, and a pellet transfer mechanism 26. The platform 22 extends generally horizontally and is stationarily disposed between the feed conveyor 16 and the storage tray 18. The stationary support track 24 is mounted upon the platform 22 and has entry and exit ends 24A, 24B respectively adjacent the feed conveyor 16 and storage tray 18. The support track 24 also forms a linear guide channel 28 having a V-shape in cross-section which defines a linear path L extending from the entry end 24A to the exit end 24B of the track 24. The channel 28 of the support track 24 is capable of aligning and guiding pellets P in an end-to-end row along the linear path L with a common longitudinal axis of the pellets coincident with the linear path.

The pellet transfer mechanism 26 includes a pair of forward and aft spaced grippers 30, each operable between pellet gripping and releasing positions. The transfer mechanism 26 is operable to move the grippers 30 through forward and return or reverse strokes from and to an initial position, seen in FIG. 1. The pellets are advanced by the transfer mechanism 26 past the laser scanning apparatus 14. Then, the pellets are released from the grippers 30 and the grippers alone are returned by the transfer mechanism 26 to the initial position.

The laser scanning apparatus 14 of the inspection system 10 includes a housing 32 which straddles the linear path L of the pellets P along the support track 24. The housing 32 extends in oblique relation to the support track 24 and defines a cavity 34 through which the track 24 extends and the pellets P are advanced by the pellet transfer mechanism 26 along the linear path defined by the track 24.

The laser scanning apparatus 14 also includes a light source 36 and a receiver 38. The light source 36 and receiver 38 are mounted to the housing 32 within and at opposite sides of the cavity 34 and adjacent to the opposite sides of the linear path L defined by the track 24. Thus, the directional path along which the laser beam B is emitted extends in a non-orthogonal orientation to the common axis of the aligned pellets P and to the linear path L of advancement of the pellets P in their end-to-end arrangement on the support track 24. The laser scanning apparatus 14 detects and measures in a known manner the outside diameter of the pellets as they are successively advanced along the track 24 through the laser beam B and past the apparatus.

It will be noted that an auxiliary air cylinder stopping mechanism 40 is provided adjacent the entry end 24A of the support track 24. When the transfer mechanism 26 is operated to advance the pellets, the stopping mechanism 40 is activated to engage the leading pellet on the feed conveyor 16 and retain the leading pellet in a stationary position thereon, preventing it from moving onto the support track 24. The stopping mechanism 40 is deactivated to release the leading pellet once the transfer mechanism 26 reaches the end of its forward stroke.

Pellet Reject Apparatus of the Invention

Referring to FIGS. 3-7, there is illustrated the pellet reject apparatus 20 of the present invention. The pellet reject apparatus 20 operates in conjunction with the pellet transfer apparatus 12 and the laser scanning apparatus 14 to monitor detection of off-size pellets and to effectuate their rapid removal from the pellet support track 24.

In its basic components, the pellet reject apparatus 20 includes a support pedestal 42, an ejector member 44, and an actuator 46. The support pedestal 42 is stationarily mounted on the platform 22 adjacent to and along one side of the support track 24. Also, the support pedestal 42 is preferably spaced from the support track 24 so as to provide enough space therebetween for an opening 48 in the platform 22 through which pellets removed from the support track 24 by the ejector member 44 can drop to a collection location below the platform.

The actuator 46 is composed of a pair of pressure fluid-actuated cylinders 50 extending parallel to one another and stationarily mounted on support pedestal 42. The use of a pair of cylinders 50 will maintain the ejector member 44 aligned with the row of pellets on the support track 24 as the ejector member 44 is moved into engagement therewith.

The ejector member 44 has an inverted L-shaped configuration in cross-section composed of an upper horizontal portion 44A and a lower vertical portion 44B. The ejector member 44 at its upper portion 44A is mounted to the piston rods 52 of the cylinders 50 and in transverse relation thereto. In the rest or dwell condition of the actuator 46, the ejector member 44 is located along and adjacent to the opposite side of the support track 24. In response to detection of an off-size diameter pellet, the actuator 46 is operated by suitable controls (not shown) to retract and move the ejector member 44 through an eject stroke across the feed path of the pellets on the support track 24 from a home position seen in FIGS. 3 and 4 (and in dashed line form in FIGS. 5 and 6 and solid line form in FIG. 7) to an end position seen in solid line form in FIGS. 5 and 6 (and in dashed line form in FIG. 7) in order to remove pellets from the support track 24 and the feed path. Also, when the ejector member 44 reaches its end position, it engages a proximity switch 54 (FIG. 4) mounted on the platform 22 which causes the actuator 46 to extend and operate through a reverse stroke moving the ejector member 44 back across the feed path from the end position to the home position.

Figure 4:
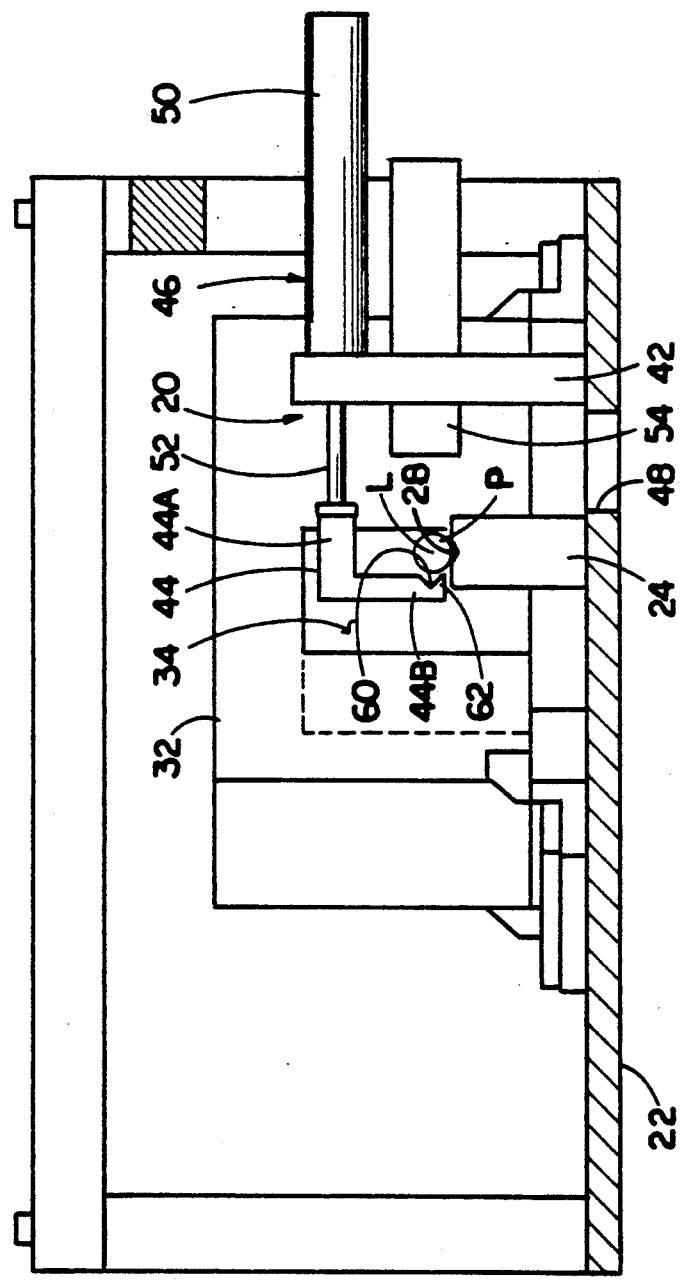
FIG. 4 is an end elevational view of the inspection system as seen along line 4—4 of FIG. 3.
Figure 5:
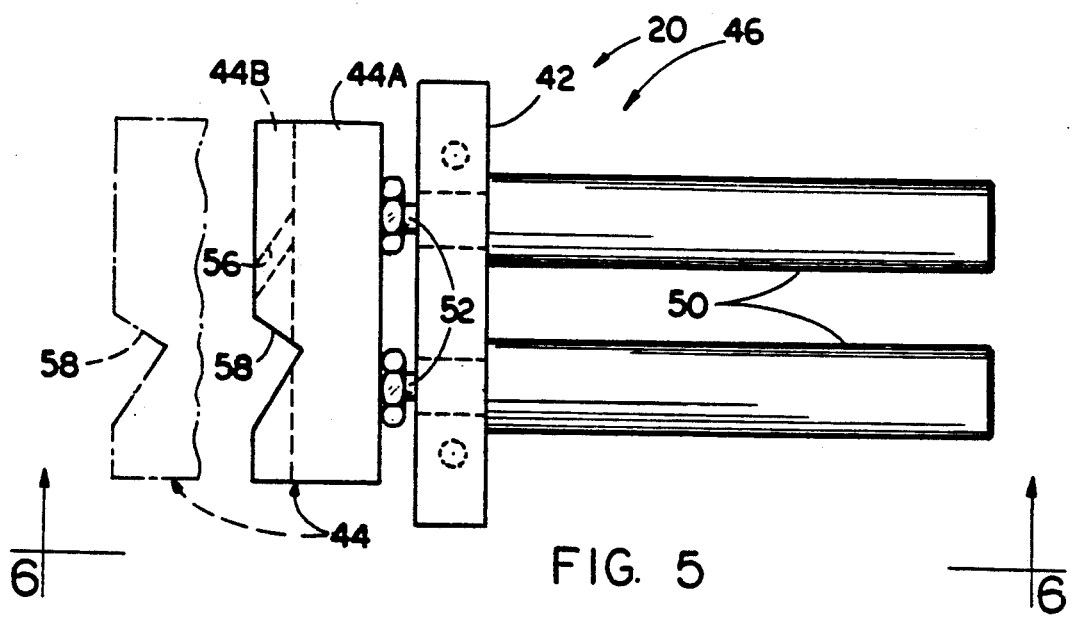
FIG. 5 is an enlarged top plan view of the pellet reject apparatus of FIG. 3 alone.
Figure 6:
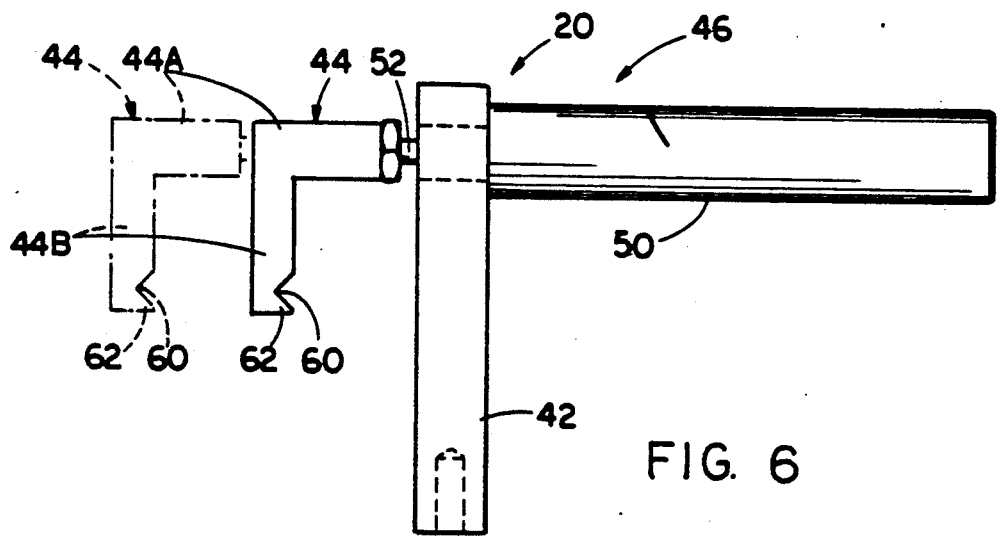
FIG. 6 is a side elevational view of the pellet reject apparatus as seen along line 6—6 of FIG. 5.

As seen in FIGS. 3 and 4, in the normal rest condition of the reject apparatus 20, the piston rods 52 are fully extended from the cylinders 50, positioning the ejector member 44 on the opposite side of the support track 24 from the cylinders 50 and support pedestal 42. This initial, rest position allows the pellets P to freely flow along the path L and to be processed by the scanning apparatus 14.

The lower portion 44B of the ejector member 44 is disposed between the light source 36 and the receiver 38 of the laser scanning apparatus 14 and thus across and obstructing the laser beam transmitted between the light source and receiver. However, the ejector member 44 has an oblique channel 56 formed in the lower portion 44B thereof such that when the ejector member 44 is located at the home position, the channel 56 permits unobstructed passage of the laser beam through the ejector member 44. Also, the upper and lower portions 44A, 44B of the ejector member 44 have a notch 58 formed therein which interfits with a portion of the housing 32 when the ejector member 44 is located at its home position, as seen in FIG. 3.

Figure 7:
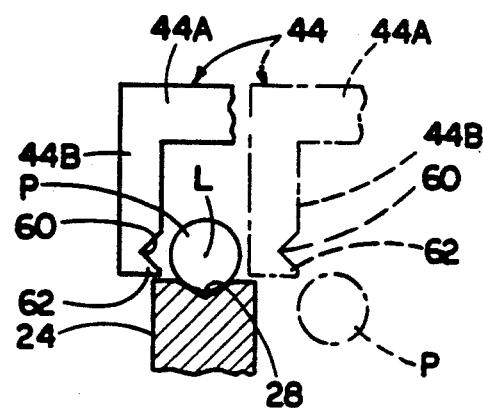
FIG. 7 is an enlarged fragmentary view of respective extended and retracted positions of a rejecter arm of the pellet reject apparatus before and after engaging a pellet on the support track of the inspection system.

Referring to FIG. 7, the vertical lower portion 44B of the ejector member 44 also has a longitudinally-extending horizontal groove 60 formed therein which defines a lower edge portion 62. The lower edge portion 62 is inclined upwardly and away from the guide channel 28 of the support track 24 and thereby is effective in engaging a lower portion of the pellets to cause them to easily roll upwardly and over an edge 28A of the guide channel 28 upon ejection of the pellets from support track 24. It has been found that if the groove 60 and inclined edge portion 62 are omitted and replaced by a vertical surface, there is a tendency for the pellets to become wedged between the ejector member 44 and the opposite edge of the support track channel edge.

When the laser scanning apparatus 14 identifies an off-sized pellet P, the pellet transfer apparatus 12 is stopped and the actuator cylinders 50 instantly retract their piston rods 52, pulling the ejector member 44 across the linear feed path L. As a result of the ejector mechanism 44 momentum, the exact final position of the off-sized pellet may range from the location of the laser beam crossing point to up to five pellets past the laser beam. Therefore, approximately five pellets are pulled from the track 24 in order to ensure that the defective one is removed. However, as can be appreciated, the exact number of pellets pulled from the track 24 in order to ensure that the defective one or ones is not limited to the number five, there may be more or less pellets removed as desired. Once the cylinders 50 have returned, the scanning process automatically resumes.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the forms hereinbefore described being merely preferred or exemplary embodiments thereof.

We claim:

1. A pellet diameter inspection system, comprising:
   (a) means for detecting and measuring the outside diameter of pellets, said detecting and measuring means being a laser scanning apparatus including a laser beam light source and receiver disposed on opposite sides of a feed path in a non-orthogonal orientation thereto and being operable for respectively emitting and receiving a laser beam emitted across the pellets;
   (b) means for transferring pellets end-to-end in a row along said feed path past said detecting and measuring means; and
   (c) a pellet reject apparatus operable for removing from the feed path any off-sized diameter pellets detected and measured by said detecting and measuring means, said pellet reject apparatus including
      (i) an ejector member having a portion disposed between said light source and said receiver when said ejector member is located at a home position, said portion having a channel permitting unobstructed passage of the laser beam through said ejector member, and
      (ii) means for supporting said ejector member along and adjacent to a side of said feed path and for moving said ejector member through an eject stroke across said feed path from said home position to an end position in order to remove pellets from said feed path and through a reverse stroke across said feed path from said end position to said home position.

2. The pellet inspection system as recited in claim 1, wherein said means for transferring pellets is a pellet transfer apparatus.

3. The pellet inspection system as recited in claim 1, wherein:

said laser scanning apparatus includes a housing straddling said feed path and defining a cavity through which the pellets are advanced along said feed path; and said ejector member has a portion disposed between said light source and receiver, said portion having a notch formed therein which interfits with a portion of said housing.

4. The pellet inspection system as recited in claim 3, wherein said housing extends in oblique relation to said feed path.

5. The pellet inspection system as recited in claim 3, wherein said light source and receiver are mounted by said housing adjacent said opposite sides of said feed path.

6. The pellet inspection system as recited in claim 1, wherein said supporting and moving means includes:

a support member mounted along and adjacent to said one side of said feed path, and an actuator mounted to said support member, said ejector member being mounted to said actuator.

7. The pellet inspection system as recited in claim 6, wherein said actuator includes a pair of pressure fluid-actuated cylinders extending parallel to one another and mounted on said support member, said ejector member being attached and mounted in transverse relation to ends of said cylinders.

8. The pellet inspection system as recited in claim 1, further comprising:

a support track having as linear guide channel for supporting pellets along said feed path;

said ejector member having a lower edge portion being inclined upwardly and away from said guide channel of said support track and thereby operable for engaging a lower portion of the pellets to cause them to roll upwardly and over an edge of said guide channel upon ejection of the pellets from said feed path.

* * * * *